US010070452B2

(12) United States Patent
Fei et al.

(10) Patent No.: US 10,070,452 B2
(45) Date of Patent: Sep. 4, 2018

(54) METHOD, DEVICE, AND SYSTEM FOR MULTI-SYSTEM PRIORITY SCAN

(71) Applicant: MOTOROLA SOLUTIONS, INC, Chicago, IL (US)

(72) Inventors: Xun Fei, Chengdu (CN); Da-Jun Chen, Chengdu (CN); Yong Tian, Chengdu (CN); Dong Zhao, Chengdu (CN); Kang-Kai Zhao, Chengdu (CN); Zu Zhou, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/553,258

(22) PCT Filed: Jun. 26, 2015

(86) PCT No.: PCT/CN2015/082466
§ 371 (c)(1),
(2) Date: Aug. 24, 2017

(87) PCT Pub. No.: WO2016/206079
PCT Pub. Date: Dec. 29, 2016

(65) Prior Publication Data
US 2018/0124801 A1 May 3, 2018

(51) Int. Cl.
*H04B 7/00* (2006.01)
*H04W 72/10* (2009.01)
(Continued)

(52) U.S. Cl.
CPC ............. *H04W 72/10* (2013.01); *H04W 4/08* (2013.01); *H04W 8/186* (2013.01); *H04W 48/18* (2013.01);
(Continued)

(58) Field of Classification Search
USPC .................................................. 455/517–521
See application file for complete search history.

(56) References Cited

U.S. PATENT DOCUMENTS 5,214,790 A     5/1993   Kozlowski
5,261,117 A  *  11/1993  Olson ................... H04W 48/18
                                                          455/510
(Continued)

FOREIGN PATENT DOCUMENTS

CN          104581651 A        4/2015

OTHER PUBLICATIONS

The International Search Report and the Written Opinion, corresponding patent application No. PCTCN2015/0082466 dated Jun. 26, 2015, all pages.

*Primary Examiner* — Fayyaz Alam
(74) *Attorney, Agent, or Firm* — Daniel R. Bestor

(57) ABSTRACT

A multi-system priority scan process including maintaining, at a mobile station (MS), a scan list including channels associated with talkgroups, the talkgroups including one or more trunked radio system talkgroups and one or more conventional radio system talkgroups. The MS negotiates, with a trunked radio system, a working channel for a particular trunked radio system talkgroup out of the trunked radio system talkgroups, the working channel being a traffic channel that the trunked radio system will first attempt to assign a call for that talkgroup. During a subsequent scan for talkgroup for activity associated with the particular trunked radio system talkgroup, the MS switches to the working channel and determines if a carrier is present on the working channel, without switching to a control channel of the trunked radio system to scan for activity associated with the particular trunked radio system talkgroup.

20 Claims, 7 Drawing Sheets

(51) Int. Cl.
*H04W 4/08* (2009.01)
*H04W 8/18* (2009.01)
*H04W 48/18* (2009.01)
*H04W 84/08* (2009.01)
*H04W 76/45* (2018.01)
*H04W 4/02* (2018.01)
*H04W 4/10* (2009.01)

(52) U.S. Cl.
CPC .............. *H04W 84/08* (2013.01); *H04W 4/02* (2013.01); *H04W 4/10* (2013.01); *H04W 76/45* (2018.02)

(56) References Cited

U.S. PATENT DOCUMENTS

| | | | | |
|---|---|---|---|---|
| 5,274,837 A | * | 12/1993 | Childress | H04L 1/14 370/344 |
| 5,517,677 A | * | 5/1996 | Moon | H04W 8/26 340/7.25 |
| 5,790,527 A | * | 8/1998 | Janky | H04B 7/2615 370/330 |
| 5,806,002 A | * | 9/1998 | Wiatrowski | H03J 1/0091 455/161.2 |
| 5,901,341 A | * | 5/1999 | Moon | H04B 1/60 455/452.1 |
| 6,519,472 B1 | | 2/2003 | Brennan et al. | |
| 8,208,393 B2 | | 6/2012 | Belmonte et al. | |
| 2010/0165904 A1 | * | 7/2010 | Woodward | H04W 72/005 370/312 |
| 2013/0171934 A1 | * | 7/2013 | Stankovska | H04W 72/082 455/41.2 |
| 2015/0327317 A1 | * | 11/2015 | Jurzak | H04W 4/90 455/404.1 |

\* cited by examiner

METHOD, DEVICE, AND SYSTEM FOR MULTI-SYSTEM PRIORITY SCAN

This application is a National Stage filing under 35 USC § 371 of co-pending Patent Cooperation Treaty international application having Serial No. PCT/CN2015/082466 (the 'PCT international application') filed on Jun. 26, 2015. This application claims priority to the PCT international application, the entire contents of which are incorporated herein by reference.

BACKGROUND OF THE INVENTION

Wireless communication systems provide for radio communication links to be arranged within the system between a plurality of user terminals. Such user terminals may be mobile and may therefore be known as mobile stations.' At least one other terminal, e.g. used in conjunction with mobile stations, may be a fixed terminal, e.g. a control terminal, base station, or access point. Such a system typically includes a system infrastructure which generally includes a network of various fixed installations such as base stations, which are in direct radio communication with the mobile stations. Each of the base stations operating in the system may have one or more transceivers which may, for example, serve mobile stations in a given local region or area, known as a 'cell' or 'site', by radio frequency (RF) communication. The mobile stations which are in direct communication with a particular base station are said to be served by the base station, and all radio communications to and from each mobile station within the system are made via respective serving base stations. Sites of neighbouring base stations in a wireless communication system may be offset from one another or may be overlapping.

Wireless communication systems may operate according to an industry standard land mobile radio (LMR) protocol such as, for example, the Project 25 (P25) standard defined by the Association of Public Safety Communications Officials International (APCO), the Digital Mobile Radio (DMR) standard, or other radio protocols. Communications in accordance with DMR, P25, or other standards may take place over physical channels in accordance with one or more of a TDMA (time division multiple access) protocol, a FDMA (frequency divisional multiple access), or CDMA (code division multiple access) protocol. Mobile stations in wireless communication systems such as DMR systems send and receive user communicated voice data (e.g., voice or audio alone or multiplexed with other data such as video or image data) and non-voice data (e.g., location data or sensor data, control signalling, etc.), herein referred to collectively as 'traffic information', in accordance with the designated protocol.

Furthermore, LMR systems may operate in either a conventional or trunked configuration. In either configuration, a plurality of mobile stations may be partitioned into separate groups of mobile stations, such that mobile stations may selectively participate in individual (mobile station to mobile station) calls and also in group (mobile station to many mobile stations) calls.

In a conventional system, each mobile station in a group is selected to a particular FDMA frequency for communications associated with that group. Thus, each group is served by one frequency (e.g., channel), and multiple groups may share the same single frequency (in which case, in some embodiments, group IDs may be present in the group data to distinguish between groups using the same shared frequency). In some systems, each conventional frequency may be further configured to carry multiple channels via a TDMA protocol, which allows for multiple concurrent calls on each frequency based on the configured ratio of the TDMA channels.

In contrast, a trunked radio system and its mobile stations use a pool of traffic channels (e.g., FDMA or TDMA protocols operating on a plurality of available physical frequencies) for virtually an unlimited number of groups of mobile stations (e.g., talkgroups). Thus, all groups are served by all channels. The trunked radio system works to take advantage of the probability that not all groups need a traffic channel for communication at the same time. When a member of a group requests a call on a control or rest channel on which all of the mobile stations in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile stations were idling to a traffic channel for the call, and instruct all mobile stations that are not participating in the new call to move to a newly assigned control or rest channel selected from the pool of available channels. With a given number of channels, a much greater number of groups can be accommodated in a trunked system as compared with conventional radio systems.

Group members for group calls conducted on conventional or trunked systems may be statically or dynamically defined. That is, in a first example, a user or administrator working on behalf of the user may indicate to the switching and/or radio network (perhaps at a call controller, push-to-talk (PTT) server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile stations) could be provisioned in the network by the user or an agent, and then provided some form of group identity, identifier, or address, for example. Then, at a future time, an originating user in a group may cause some signalling to be transmitted indicating that he or she wishes to establish a communication session (e.g., group call) with each of the pre-designated participants in the defined group. In another example, mobile stations may dynamically affiliate with a group (and also disassociate with the group) perhaps based on user input, and the switching and/or radio network may track group membership and route new group calls according to the current group membership.

In some situations, a trunked radio system and a conventional radio systems may be used in a same or partially overlapping geographic area, and mobile stations operating in the area may be configured to operate on both systems. In order to detect a group or individual call across such disparate systems, a scan mechanism may be implemented at each mobile station in which the mobile station is configured to scan the conventional channels in the conventional radio system and the control or rest channel in the trunked system for new calls that the mobile station is interested in (e.g., individual calls directed to the mobile station and/or group calls to groups that the mobile station is subscribed to or otherwise interested in). Many scan systems implement a 'carrier detect' mechanism in which multiple channels are scanned to determine if a 'valid' signal is present on that channel. Once a carrier is detected, the signal may be further decoded to determine if it is a group or individual call that the mobile station is interested in receiving.

One problem that has arisen in implementing such a scan system across trunked and conventional radio systems is that the control or rest channel of the trunked radio system is always transmitting (e.g., a carrier is always present). Accordingly, when a mobile station implements a scan across trunked and conventional radio systems, it must always stop on the control channel for a relatively significant period of time (e.g., 1-5 seconds depending on traffic on the control channel) to decode messages being transmitted on the control channel in order to determine if an individual or group call of interest to the mobile station is active in the trunked radio system. In the mean time, the mobile station may miss a start of an important call elsewhere on one of the conventional channels in the conventional radio system.

Accordingly, what is needed is an improved method, device, and system for scanning across trunked and conventional radio systems.

DETAILED DESCRIPTION OF THE INVENTION

Figure 1:
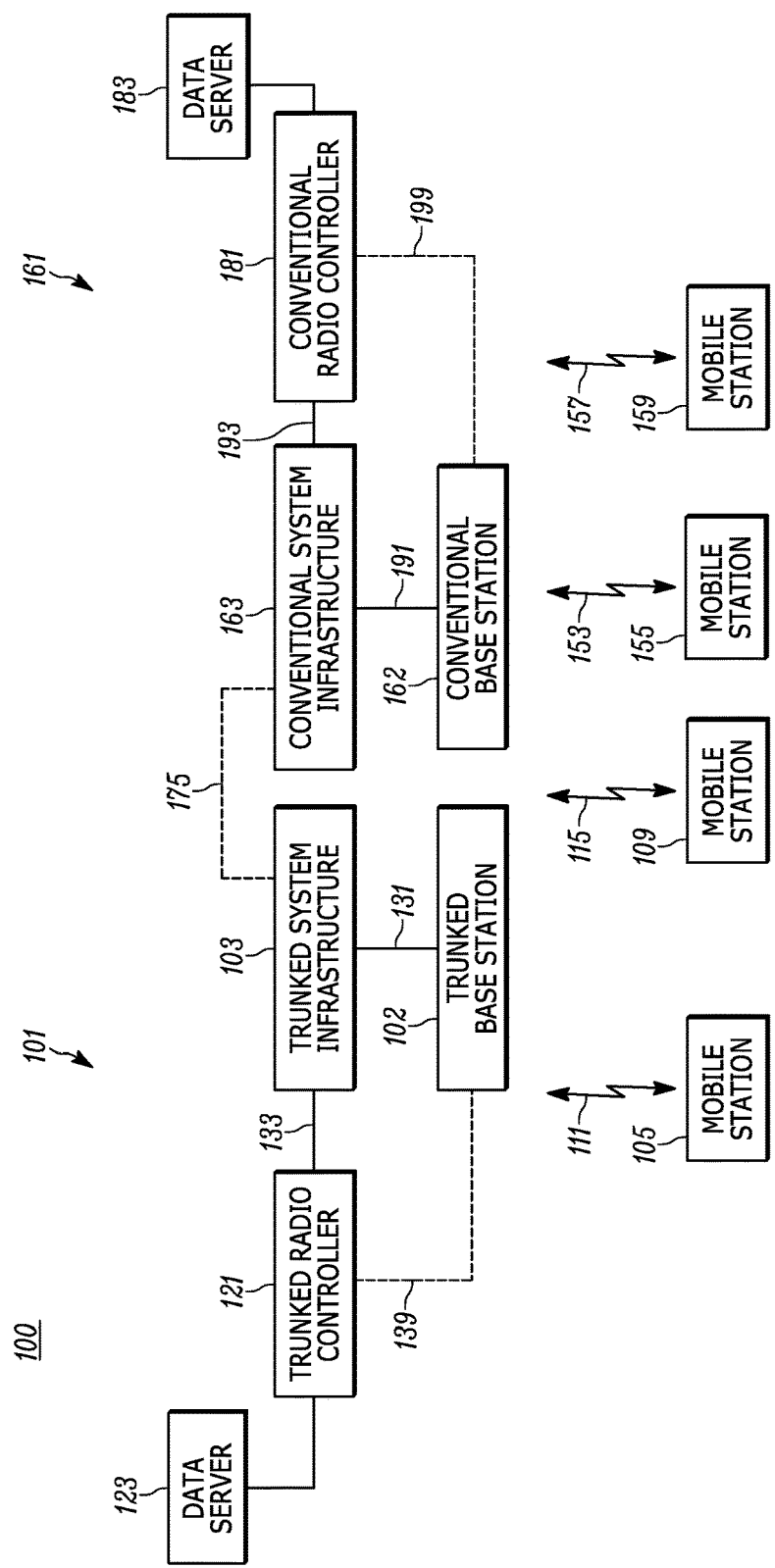
FIG. 1 is a schematic diagram of multiple wireless communication systems in accordance with an embodiment.

Disclosed is an improved an improved method, device, and system for scanning across trunked and conventional radio systems.

In one embodiment, a method of multi-system priority scan includes: maintaining, at a mobile station, a scan list including channels associated with talkgroups the mobile station is interested in receiving, the talkgroups including one or more trunked radio system talkgroups and one or more conventional radio system talkgroups; negotiating, with a trunked radio system, a working channel for a particular trunked radio system talkgroup out of the one or more trunked radio system talkgroups, wherein the working channel is a traffic channel that the trunked radio system will first attempt to assign a call for the particular trunked radio system talkgroup; and during a subsequent scan for talkgroup activity in one or more of the talkgroups in the scan list, scanning for activity associated with the particular trunked radio system talkgroup by switching to the working channel and determining if a carrier is present on the working channel, without switching to a control channel of the trunked radio system to scan for activity associated with the particular trunked radio system talkgroup.

In another embodiment, a mobile station comprises: a transceiver; an input; a speaker; a microphone; a processor; and a computer readable memory having instructions stored thereon that, in response to execution by the processor, cause the mobile station to perform a set of operations comprising: maintain a scan list including channels associated with talkgroups the mobile station is interested in receiving, the talkgroups including one or more trunked radio system talkgroups and one or more conventional radio system talkgroups; negotiate, with a trunked radio system via the transceiver, a working channel for a particular trunked radio system talkgroup out of the one or more trunked radio system talkgroups, wherein the working channel is a traffic channel that the trunked radio system will first attempt to assign a call for the particular trunked radio system talkgroup; and during a subsequent scan for talkgroup activity in one or more of the talkgroups in the scan list, scan, via the transceiver, for activity associated with the particular trunked radio system talkgroup by switching to the working channel and determine, via the transceiver, if a carrier is present on the working channel, without switching to a control channel of the trunked radio system to scan for activity associated with the particular trunked radio system talkgroup.

In a still further embodiment, a radio controller in a trunked radio network includes: a transceiver; a processor; and a computer readable memory having instructions stored thereon that, in response to execution by the processor, cause the radio controller to perform operations comprising: receive, via the transceiver from a mobile station, a multiple system priority scan request message identifying a particular trunked radio system talkgroup in the trunked radio network; identify an available trunked traffic channel, out of a plurality of trunked traffic channels in the trunked radio network; assign the available trunked traffic channel as a working channel for the particular trunked radio system talkgroup, wherein the working channel is a traffic channel that the radio controller will first attempt to assign any call for the particular trunked radio system talkgroup to; and respond to the multiple system priority scan request by transmitting a mapping message to the mobile station that maps the particular trunked radio system talkgroup to the assigned working channel.

Each of the above-mentioned embodiments will be discussed in more detail below, starting with example network and device architectures of systems in which the embodiments may be practiced, followed by a discussion of trunked and conventional radio system scanning from a system perspective, including in particular, processes executed at mobile stations operating across both radio systems and at a radio controller of the trunked radio communication system. Further advantages and features consistent with this disclosure will be set forth in the following detailed description, with reference to the figures.

I. Network and Device Architecture

FIG. 1 shows multiple wireless radio communication systems 100 that may be adapted in accordance with an embodiment of the disclosure, including a trunked wireless radio communication system 101 and a conventional wireless radio communication system 161. It will be apparent to those skilled in the art that the systems 100 and the components that are to be described as operating therein may take a number of forms well known to those skilled in the art. Thus, the layout of the systems 100, and of its operational components to be described, should be regarded as illustrative rather than limiting. The systems 100 of FIG. 1 will be described as an illustrative wireless communication system such as a system capable of operating in accordance with the P25 standard and/or the DMR standard, but may be equally applied to other currently known and/or future standards protocols.

The systems 100 shown in FIG. 1 includes one or more base stations 102, 162 operably connected to a respective system infrastructure 103, 163 via respective wired or wireless links 131, 191. As used herein, the term "base station" (BS) refers to any entity that includes one or more transmitters and/or receivers (together making transceivers) to perform the functionality of receiving traffic information from a signal source (e.g. initiating/transmitting mobile station 105) and transmitting some or all of the traffic information to one or more signal destinations (e.g, mobile station 109, mobile station 155, mobile station 159, system infrastructure 103, etc.). In this example, the BS 102 is a trunked base station in the trunked radio communication system 101 supporting a control or rest channel and one or more traffic channels in a pool of available traffic channels assignable to a trunked talkgroup call on demand, and the BS 162 is a conventional base station in the conventional radio communication system 161 supporting conventional channels pre-configured to be associated with one or more conventional talkgroups.

The trunked BS 102 has radio links with a plurality of mobile stations (MSs), particularly MSs in a service cell or site at least partially defined by a geographic location of the BS 102, and the conventional BS 191 has radio links with a plurality of MSs, particularly MSs in a service cell or site at least partially defined by a geographic location of the BS 191. In this example, the service cell or site associated with BSs 102 and 191 at least partially overlaps such that MSs 105, 109, 155, and 159 may communicate with either or both of the trunked BS 102 and the conventional BS 191.

Trunked BS 102 may maintain a direct wireless or wired link 139 (or indirect link via trunked system infrastructure 103) with a trunked radio controller 121 or other radio network communications device (such as a zone controller). While the trunked radio controller 121 is illustrated as a separate entity in the system 100, in other embodiments, the trunked radio controller 121 may be integrated with other devices (such as a zone controller) in trunked system infrastructure 103 and/or with trunked BS 102. The trunked radio controller 121 may further be configured to provide registration, authentication, encryption, routing, and/or other services to trunked BS 102 so that MSs operating within its coverage area may communicate with other MSs in the system 100. The trunked radio controller 121 may also track or have access to group subscription information that, for each group identifier associated with a particular group of radios (e.g., talkgroup), identifies MSs (e.g., by hardware ID, hardware MAC address, IP address, radio ID, International Mobile Subscriber Identity (IMSI), a serial number, or some other unique identifier that can be used to identify subscribed member MSs) and/or other devices (e.g., dispatch consoles in trunked system infrastructure 103) that are members of the particular group. Additionally or alternatively, the trunked radio controller 121 may also have access to a data server 123. Group subscription information, among other types of information, could be tracked or made accessible to trunked radio controller 121 via data server 123 as well.

BS 191 may similarly maintain a direct wireless or wired link 191 (or indirect link via conventional system infrastructure 163) with a conventional radio controller 181 or other radio network communications device (such as a zone controller). While the conventional radio controller 181 is illustrated as a separate entity in the system 100, in other embodiments, the conventional radio controller 181 may be integrated with other devices (such as a zone controller) in conventional system infrastructure 163 and/or with conventional BS 162. The conventional radio controller 181 may further be configured to provide registration, authentication, encryption, routing, and/or other services to conventional BS 162 so that MSs operating within its coverage area may communicate with other MSs in the system 100. The conventional radio controller 181 may also track or have access to group subscription information that, for each group identifier associated with a particular group of radios, identifies MSs and/or other devices that are members of the particular group. Additionally or alternatively, the conventional radio controller 181 may also have access to a data server 183. Group subscription information, among other types of information, could be tracked or made accessible to conventional radio controller 181 via data server 183 as well.

Four MSs 105, 109, 155, 159 are illustrated in FIG. 1 as being within the service area of BSs 102, 162 via respective radio links 111, 115, 153, 157. The radio links 111, 115, 153, 157 may operate according to a conventional or trunked FDMA or TDMA LMR protocol, some combination thereof, and/or some other air-interface protocol, and may represent wireless links with either one of BSs 102, 162, and which may change over time as the MSs roam between conventional and trunked wireless systems 101, 161. In some instances, the radio links 111, 115, 153, 157 may represent separate physical or logical channels while in other instances may represent a single physical or logical multicast or broadcast channel, and each channel may comprise a channel set including an uplink channel portion and a downlink channel portion separated by time, frequency, or code.

The trunked BS 102 thereby serves MSs including the MSs 105, 109, 155, 159 with trunked radio communications to and from other terminals, including (i) MSs served by the trunked BS 102, (ii) MSs served by other BSs in the same system (not shown), (iii) other terminals including MSs in other systems (such as in conventional radio communications system 161 accessible via an inter-system link 175) operably linked via the system infrastructure 103, and (iv) a dispatch console (not shown).

Similarly, the conventional BS 162 thereby serves MSs including the MSs 105, 109, 155, 159 with conventional radio communications to and from other terminals, including (i) MSs served by the conventional BS 162, (ii) MSs served by other BSs in the same system (not shown), (iii) other terminals including MSs in other systems (such as in trunked radio communications system 101 accessible via an inter-system link 175) operably linked via the system infrastructure 163, and (iv) a dispatch console (not shown).

Each system infrastructure 103, 163 includes known sub-systems required for operation of the respective trunked and conventional radio system. Such sub-systems may include, for example, sub-systems providing additional authentication, routing, registration, location, system management, encryption, and other operational functions within the respective system. Each system infrastructure 103, 163 may also provide routes to other BSs providing cells serving other MSs, and/or may provide access to other external types of networks such as the plain old telephone system (POTS) network or a data-switched network such as the Internet. The trunked system infrastructure 103 may also maintain a separate link 133 to the trunked radio controller 121, and the conventional system infrastructure 163 may also maintain a separate link 193 to the conventional radio controller 181.

Data servers 123, 183 may each be a storage device and/or application server that stores and/or otherwise processes data provided by MSs, such as group membership data, location data, and/or sensor data. Data stored at the data servers 123, 183 may be made available (before or after further processing executed at the data server 123, 183) at a display directly coupled to the data server 123, 183, at MSs in the system 100, or at a dispatch console device otherwise coupled to the respective system, among other possibilities. While the data server 123, 183 is illustrated as a separate entity, in other embodiments, the data server 123, 183 may be respectively integrated with other devices in the system 100 such as the radio controllers 121, 181, other devices in the system infrastructures 103, 163, and/or may otherwise be accessible via one or more of the external types of networks noted above.

Figure 2:
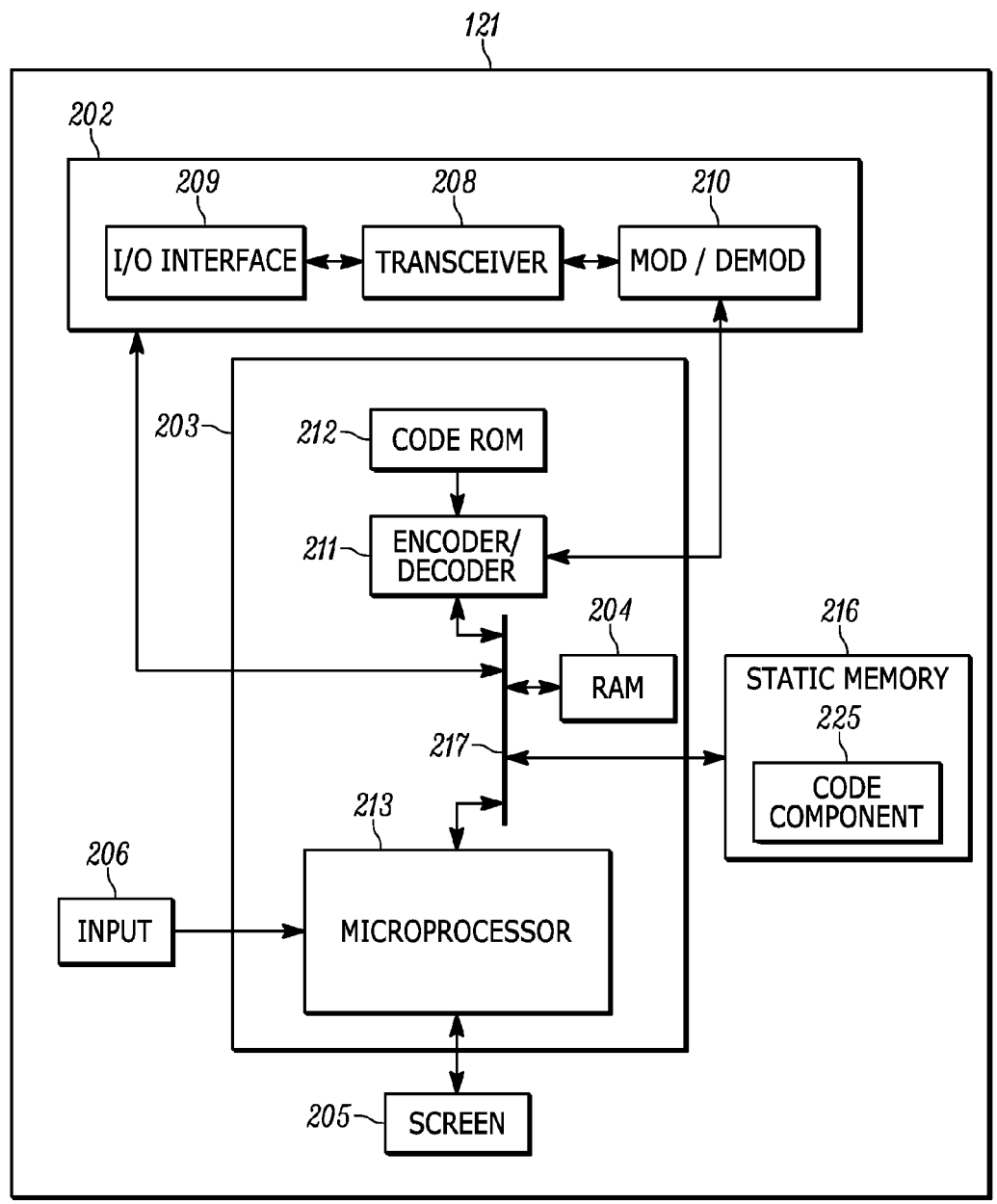
FIG. 2 is a block diagram of an illustrative layout of a radio controller of the system of FIG. 1 in accordance with an embodiment.

FIG. 2 is an example functional block diagram of a trunked radio controller 121 operating within the trunked radio communications system 101 of FIG. 1 in accordance with some embodiments. As shown in FIG. 2, trunked radio controller 121 includes a communications unit 202 coupled to a common data and address bus 217 of a processing unit 203. The trunked radio controller 121 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for initializing system components, and encoding and/or decoding voice, data, control, or other signals that may be transmitted or received between the trunked radio controller 121 and BSs or MSs in the system 100. The processing unit 203 may further include a microprocessor 213 coupled, by the common data and address bus 217, to the encoder/decoder 211, a Random Access Memory (RAM) 204, and a static memory 216.

The communications unit 202 may include one or more wired or wireless input/output (I/O) interfaces 209 that are configurable to communicate with MSs such as MSs 105, 109, 155, 159, and/or with other devices in or communicably coupled to the trunked system infrastructure 103. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIGS. 4-5 and accompanying text. Static memory 216 may also store, permanently or temporarily, group subscription information that, for each group identifier associated with a particular group of MSs, identifies MSs that are members of the particular group, and for each group, stores a trunked traffic channel assigned as a working channel for that group. Other types of information could be tracked and/or stored in static memory 216 as well.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
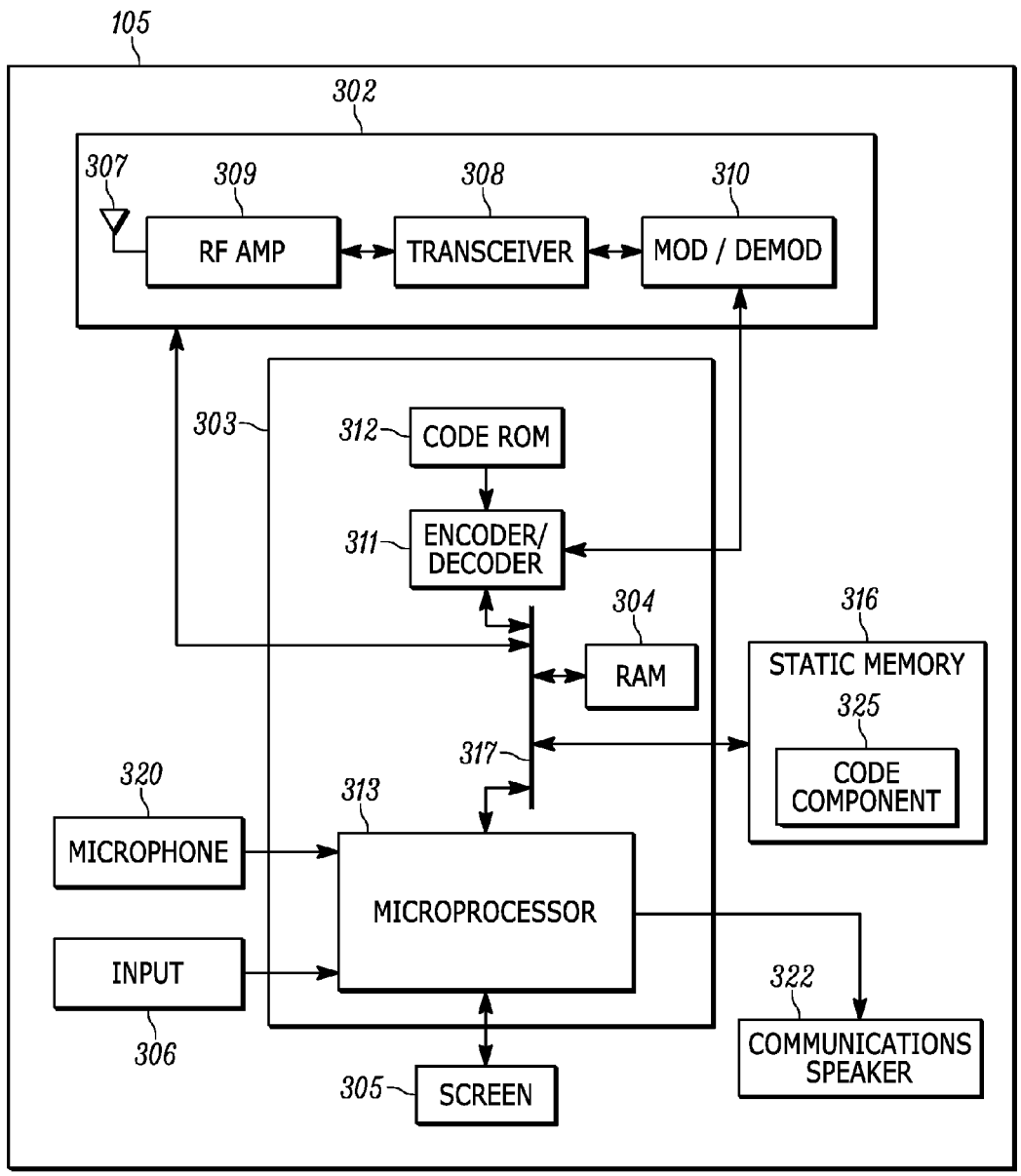
FIG. 3 is a block diagram of an illustrative layout of a mobile station of the system of FIG. 1 in accordance with an embodiment.

FIG. 3 is an example functional block diagram of a MS such as MS 105 operating within the system 100 of FIG. 1 in accordance with some embodiments. Other MSs such as MSs 109, 155, and 159 may contain same or similar structures. As shown in FIG. 3, MS 105 comprises a radio frequency communications unit 302 coupled to a common data and address bus 317 of a processing unit 303. The MS 105 may also include an input 306 and a display screen 305, each coupled to be in communication with processing unit 303. A microphone 320 captures audio from a user that is further vocoded by processing unit 303 and transmitted as voice data by communication unit 302 to other MSs or the infrastructure. A communications speaker 322 reproduces audio that is decoded from voice data transmissions received from other MSs via the communications unit 302.

The processing unit 303 may also include an encoder/decoder 311 with an associated code Read Only Memory (ROM) 312 for storing data for initializing system components and encoding and/or decoding voice or other traffic information that may be transmitted or received by the MS 105. The processing unit 303 may further include a microprocessor 313 coupled, by the common data and address bus 317, to the encoder/decoder 311, a Random Access Memory (RAM) 304, and a static memory 316.

The radio frequency communications unit 302 is a combined receiver and transmitter (e.g., transceiver) having a common antenna 307. The radio frequency communications unit 302 has a transceiver 308 coupled to the antenna 307 via a radio frequency amplifier 309. The transceiver 308 may be a transceiver operating in accordance with one or more trunked and/or conventional standard protocols, such as a DMR transceiver, a P25 transceiver, a TETRA transceiver, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input 306 and to the display screen 305. The microprocessor 313 further has ports for coupling to the microphone 320 and to the speaker 322. In some embodiments of the present disclosure, the static memory 316 may store operating code for the microprocessor 313 that, when executed by the microprocessor 313, perform one or more of the MS processing, transmitting, and/or receiving steps set forth in FIGS. 4-5 and accompanying text. Static memory 316 may comprise, for example, a HDD, an optical disk drives such as a CD drive or DVD drive, a SSD, a tape drive, a flash memory drive, or a tape drive, to name a few.

II. Multi-System Priority Scan Processes

FIGS. 4-5 set forth first and second example ladder diagrams 400, 500 in a communications network, such as communications network 100 of FIG. 1, illustrating processes for implementing a priority scan across trunked and conventional radio systems. Of course, additional steps, receptions, and/or transmissions not disclosed herein could be additionally added before, after, or in-between steps, receptions, and/or transmissions disclosed in FIGS. 4-5, and the presence of such additional steps, receptions, and/or transmissions would not negate the purpose and advantages of the examples set forth in detail throughout the remainder of this disclosure. Although FIGS. 4 and 5 illustrate process steps involving a single example MS 105, same or similar processes may be executed at other MSs such as MSs 109, 155, and 159 of the wireless radio communication system 100 of FIG. 1. Furthermore, in each of FIGS. 4-5, it is assumed that the conventional BS 162 of FIG. 1, supported by conventional radio controller 181 (not shown in FIGS. 4-5), provides a first conventional channel 1 402, a second conventional channel 2 404, and a third conventional channel 3 406, although in other embodiments more or fewer conventional channels may be provided, spread across one or more conventional BSs. Still further, in each of FIGS. 4-5, it is assumed that the trunked BS 102 of FIG. 1, supported by trunked radio controller 121, provides a control or rest channel 408 and a pool of assignable traffic channels including a first trunked traffic channel 1 410 and a second trunked traffic channel 2 412, although in other embodiments more or fewer trunked traffic channels may be provided, spread across one or more trunked BSs.

Figure 4A:
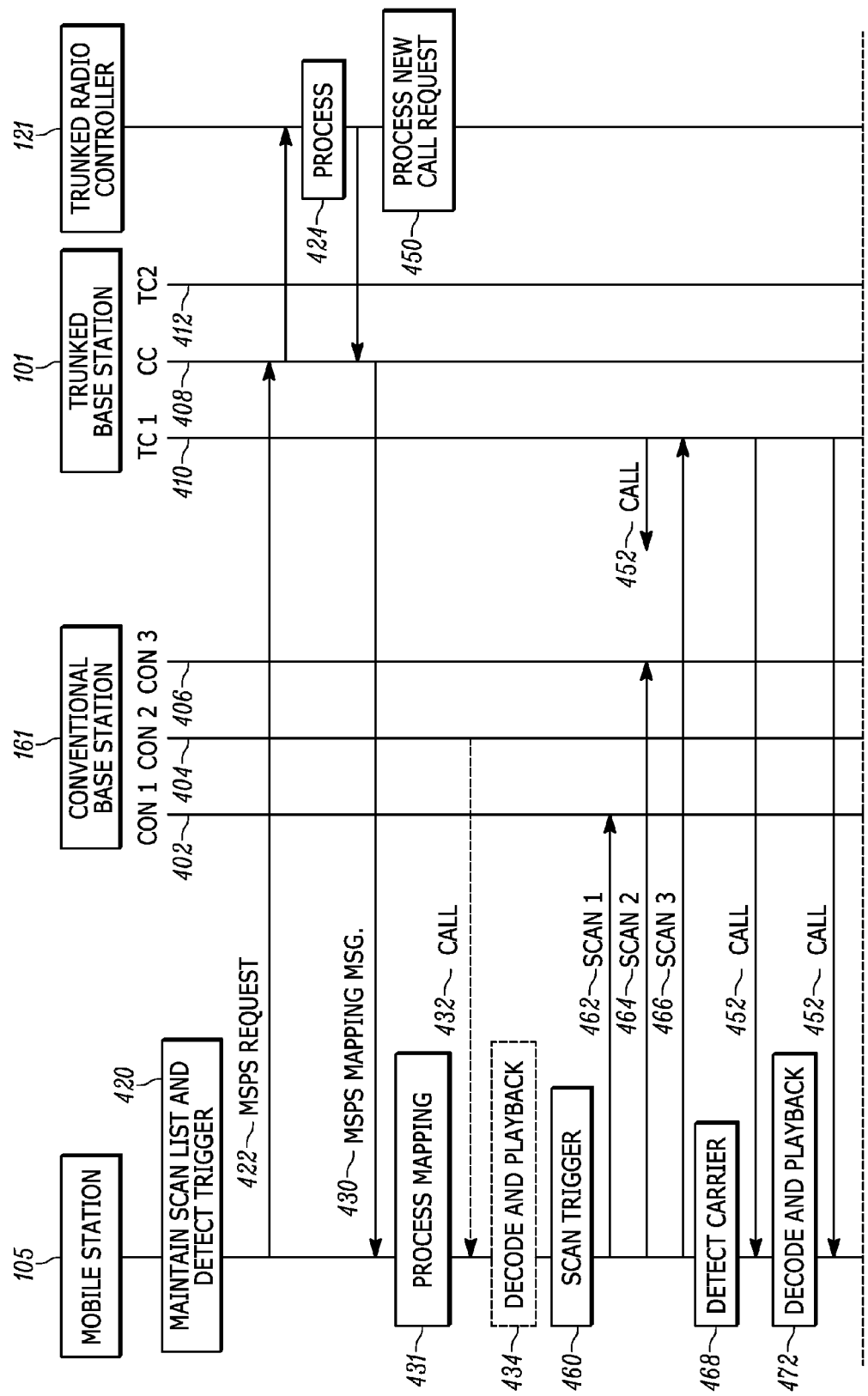
FIGS. 4A-4B set forth a ladder diagram illustrating a first example process for scanning multiple wireless communication systems in accordance with an embodiment.
Figure 4B:
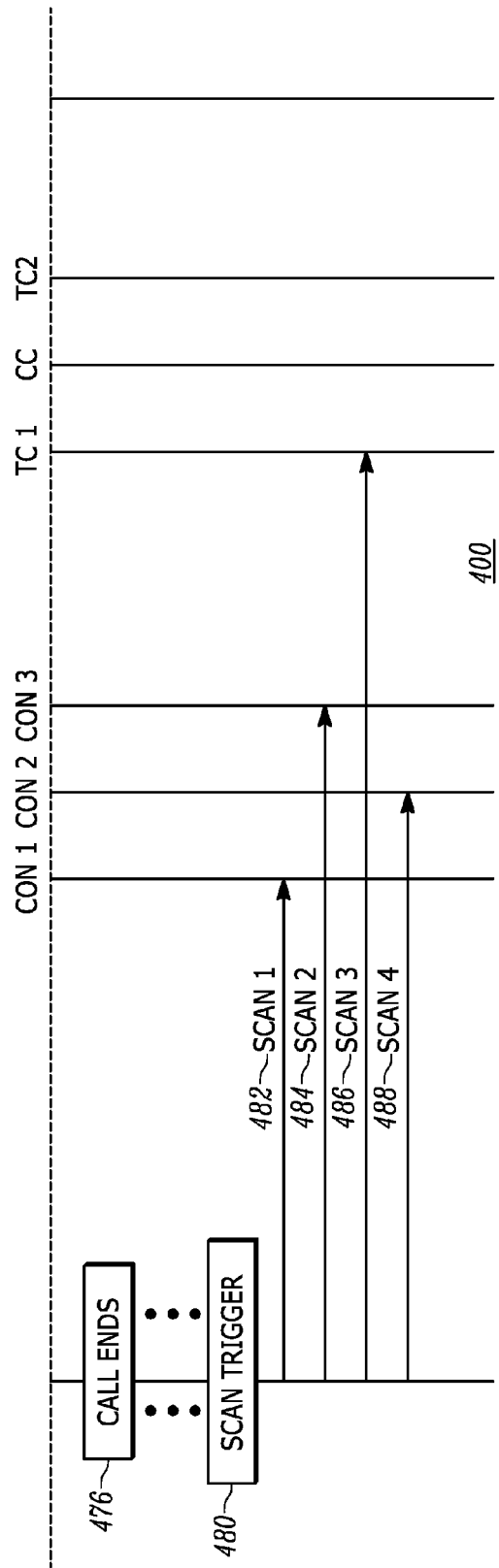

FIGS. 4A-4B illustrate a first example ladder diagram 400 in accordance with an embodiment for priority scanning across trunked and conventional radio systems. Starting at step 420 of FIG. 4A, MS 105 maintains a scan list of channels. The scan list may be an un-prioritized list of channels and/or talkgroups that the MS is subscribed to or otherwise interested in, or may be prioritized in a number of ways. Prioritization of channels may be effected by ordering the channels such that higher priority channels are scanned first, or effected in some other manner, such as scanning higher priority channels more often than lower priority channels.

For example, the scan list may recite one or more conventional talkgroups or channels accessible via conventional BS 162. The scan list itself may include conventional channel frequency and/or time slot information assigned to or associated with each conventional talkgroup or conventional channel, or such information may be obtained via a separate database or lookup table.

The scan list may be pre-configured at the MS 105 via a provisioning process, or may be obtained via an over-the-air update from one or more of conventional BS 162 and trunked BS 102. In still further embodiments, the scan list may be generated via user input using a user interface of the MS 105 such as input 306 of FIG. 3. The scan list may be stored, for example, in a local storage such as static memory 316 of FIG. 3.

Additionally, the scan list may recite one or more trunked talkgroups accessible via trunked BS 102. Typically, and unlike conventional systems, trunked talkgroups are not associated or assigned to a particular trunked traffic channel in the trunked radio system, but instead a trunked traffic channel is dynamically assigned as call requests are received by the trunked radio system. However, and in accordance with this disclosure, a working channel is assigned to each trunked talkgroup in the scan list. A working channel is a trunked traffic channel that the trunked radio system will first attempt to assign a group call (e.g., a one to many transmission of traffic information) for the particular associated trunked radio system talkgroup, such that if no carrier is detected on the assigned working channel in the trunked radio system, it is guaranteed that no call exists for the particular associated trunked radio system talkgroup. By assigning a working channel to each trunked talkgroup that the MS is subscribed to or otherwise interested in, a MS such as MS 105 can more efficiently conduct a prioritized scan process consistent with the following detailed disclosure. For example, the time it takes the MS to detect a carrier, which varies depending on protocol and other radio parameters but may generally be in the range of 10-100 ms or 15-50 ms, is much shorter than the time to decode messages on the control channel and determine whether a call exists for a subscribed/interested talkgroup (e.g., on the order of 1-5 s).

In the example set forth in FIG. 4A, it is assumed that the MS 105 maintains a scan list at step 420 that includes a first conventional talkgroup assigned to conventional channel 1 402 and a second conventional talkgroup assigned to conventional channel 2 406, and that the first conventional talkgroup is a higher priority talkgroup than the second conventional talkgroup, and thus appears higher in the scan list and is scanned first during a channel scan. Also at step 420, the MS 105 detects a trigger to transmit a multiple system priority scan (MSPS) request to trunked BS 102 relative to a first trunked talkgroup. The trigger may be caused by an initial registration with trunked BS 102, a new association with the first trunked talkgroup, an enabling of a MSPS setting at MS 105, or some other action or change in parameter at MS 105.

In response to detecting the trigger at step 420, MS 105 transmits an MSPS request 422 to trunked BS 102 via an uplink portion of the control channel 408. The MSPS request 422 identifies the first trunked talkgroup that the MS 105 is interested in, perhaps along with one or more other trunked talkgroups that the MS 105 may also be interested in. The trunked BS 102 forwards the request to trunked radio controller 121 for processing. At step 424, the trunked radio controller 121 receives the MSPS request 422. If a working channel has already been assigned to the first trunked talkgroup, the trunked radio controller 121 generates an MSPS mapping message 430 that identifies the working channel previously assigned to the first trunked talkgroup. If, on the other hand, no working channel has yet to be assigned to the first trunked talkgroup, the trunked radio controller 121 identifies a traffic channel out of the pool of trunked traffic channels available to be assigned as a working channel for the first trunked talkgroup. For example, the identified working channel may be a trunked traffic channel that has not yet been assigned as a working channel to any other trunked talkgroup, has been assigned to a minimum number of trunked talkgroups, or is a least utilized trunked traffic channel over a tracked prior period of time. The trunked radio controller 121 stores a mapping that maps the assigned working channel to the first trunked talkgroup for future reference such that, for any subsequent group call to the first trunked talkgroup, the trunked radio controller 121 will first attempt to assign that subsequent group call to the working channel stored in the mapping. As a result, if a MS detects no carrier on the assigned working channel in the trunked radio system for the first trunked talkgroup, it is guaranteed that no call exists for the first trunked talkgroup in the trunked radio system. The mapping may be stored, for example, in static memory 216 of the trunked radio controller 121 in FIG. 2 or in the remote data server 123 of FIG. 1, among other possibilities. Furthermore, the mapping is provided back to the MS 105 via the MSPS mapping message 430 response. In this example, the trunked radio controller 121 identifies trunked traffic channel 1 410 as the working channel for the first trunked talkgroup, stores the mapping, and causes the mapping to be transmitted to the MS 105 via the MSPS mapping message 430.

While in this example the MSPS request 422 and MSPS mapping message 430 response only recited a single trunked talkgroup and corresponding working channel, in other examples, multiple trunked talkgroups may be indicated in the MSPS request 422 and multiple assigned working channels may be assigned and indicated in the MSPS mapping message 430 response.

At step 431, the MS 105 receives the MSPS mapping message 430 and modifies its scan list with the first trunked talkgroup to working channel mapping identified in the MSPS mapping message 430. In this example, the MS 105 modifies the locally stored scan list to associate the assigned working channel (trunked traffic channel 1 410) with the first trunked talkgroup in the locally stored scan list that was negotiated with the trunked radio controller 121 via steps 420-431.

At a subsequent optional step, the MS 105 joins a conventional talkgroup call 432 via conventional channel 2 404 and, at step 434, decodes and begins playing back media associated with the conventional talkgroup call 432.

At step 450, the trunked radio controller 121 detects and processes a new call request from a MS, dispatch console, or some other source communication device that has requested to transmit a new group call to the first trunked talkgroup. In response, the trunked radio controller 121 retrieves the working channel mapping for the first trunked talkgroup (e.g., locally via static memory 216 or remotely via data server 123) and identifies trunked traffic channel 1 410 as the working channel for the requested new first trunked talkgroup call. As a result, the trunked radio controller 121 first checks to see if the trunked traffic channel 1 410 is available and, since it is in this example, assigns the new first trunked talkgroup call to the trunked traffic channel 1 410 and grants the call request. The new first trunked talkgroup call is then caused to be repeated 452 at the trunked BS 102 on trunked traffic channel 1 410.

At step 460, and in the mean time, the MS 105 detects a scan trigger. The scan trigger may be triggered for any number of reasons, such as the passage of a preconfigured period of time between channel scans (e.g., 30-360 seconds), an input activation at a user interface 306 of MS 105 associated with beginning a scan operation, receipt of an instruction from an infrastructure such as from conventional BS 162 or trunked BS 102 to begin a scan operation, completion of a prior channel scan, or for some other reason. In an alternate embodiment, and in an example where the MS 105 is engaged in the conventional talkgroup call 432, and perhaps depending on a priority level associated with the conventional talkgroup call 432 being above a threshold priority level or the conventional talkgroup call 432 being a highest priority in the scan list, the scan trigger 460 may be ignored.

In response to detecting the scan trigger 460, the MS 105 begins a scan operation. In an embodiment in which the MS 105 is idle, it may directly begin the scan operation. In an embodiment in which the MS 105 is engaged in conventional talkgroup call 432, it may wait for a period of inactivity in the call 432, an off-timeslot in the call 432, a control signalling period of the call 432, or some other beneficial period of time such that an amount of missed media of the conventional talkgroup call 432 may be minimized. As set forth earlier, in the event that the scan list does not include any prioritization of channels, the MS 105 may randomly select a channel order for the channel scan, or may use a first in, first scan method such that the last-added channel is scanned last. Alternatively, if the scan list is a prioritized scan list or includes indications of channel or talkgroup priorities, the order of scan may be set accordingly. In the example of FIGS. 4A-4B, it is assumed that the channels are prioritized in the following order (from highest priority to lowest priority): conventional channel 1 402, conventional channel 3 406, first trunked talkgroup working channel/trunked traffic channel 1 410, conventional channel 2 404.

The scan operation by MS 105, in accordance with the prioritized scan list maintained at the MS 105, begins by the MS 105 switching its receiver or transceiver to conventional channel 1 402 and scanning 462 the channel for a presence of a carrier that would indicate a presence of a call associated with one or more conventional talkgroups the MS 105 is interested in on conventional channel 1 402. In this case, there is no carrier detected, so the MS 105 proceeds to the next channel in the scan list by the MS 105 switching its receiver or transceiver to conventional channel 3 406 and scanning 464 the channel for a presence of a carrier that would indicate a presence of a call associated with one or more conventional talkgroups the MS 105 is interested in on conventional channel 3 406. Again, there is no carrier detected, so the MS 105 proceeds to the next channel in the scan list by the MS 105 switching its receiver or transceiver to the first trunked talkgroup working channel/trunked traffic channel 1 410 and scanning 466 the channel for a presence of a carrier that would indicate a presence of a call associated with one or more trunked talkgroups the MS 105 is interested in and that are mapped to trunked traffic channel 1 410 as a working channel. Although in the example of FIGS. 4A-4B only one working channel is in the scan list maintained at the MS 105, in other embodiments in which multiple trunked talkgroups were included in the MSPS request 422 and MSPS mapping message 430, the MS 105 may check multiple working channels in the trunked radio system for a call of interest.

In the example of FIG. 4A, because the first trunked talkgroup call 452 is present on the first trunked talkgroup working channel/trunked traffic channel 1 410, the MS 105 detects a carrier at step 468 via the scanning process 466. Because the trunked traffic channel 1 410 is the assigned working channel for the first trunked talkgroup, it is likely that the detection of a carrier indicates an active first trunked talkgroup on working channel/trunked traffic channel 1 410, but it is not guaranteed, as another trunked talkgroup could potentially be assigned trunked traffic channel 1 410 as its working channel as well. Accordingly, at step 472, the MS 105 retrieves and decodes control signalling (e.g., headers and/or embedded signalling) via call 452, determines via the signalling that the call 452 is in fact a first trunked talkgroup call that it is interested in, and subsequently begins playing back decoded media for the call 452. The MS 105 continues playing back media for the call 452, and perhaps executing one or more additional scan operations to scan higher priority channels during the first trunked talkgroup call 452, until the call 452 ends at step 476 of FIG. 4B. In some embodiments, and assuming the conventional call 432 is still ongoing after the call 452 ends at step 476, the MS 105 may rejoin the conventional call 432 on conventional channel 2 404.

At step 480, another scan trigger is detected and the MS 105 begins another scan operation, starting again with conventional channels 1 402 and 3 406 via scan operations 482 and 484, during which no carrier is detected on either of one of the conventional channels. MS 105 then scans the working channel/trunked traffic channel 1 410 for a carrier and, finding none, can be guaranteed that there is no call activity for the first trunked talkgroup available at BS 102

(or any other trunked BSs associated with the trunked radio controller 121). Finally, and assuming the conventional call 432 had ended, the MS 105 scans conventional channel 2 404 and finds no carrier. The MS 105 subsequently returns to an idle state and awaits another scan trigger or, in some embodiments, immediately begins another round of scan.

Figure 5A:
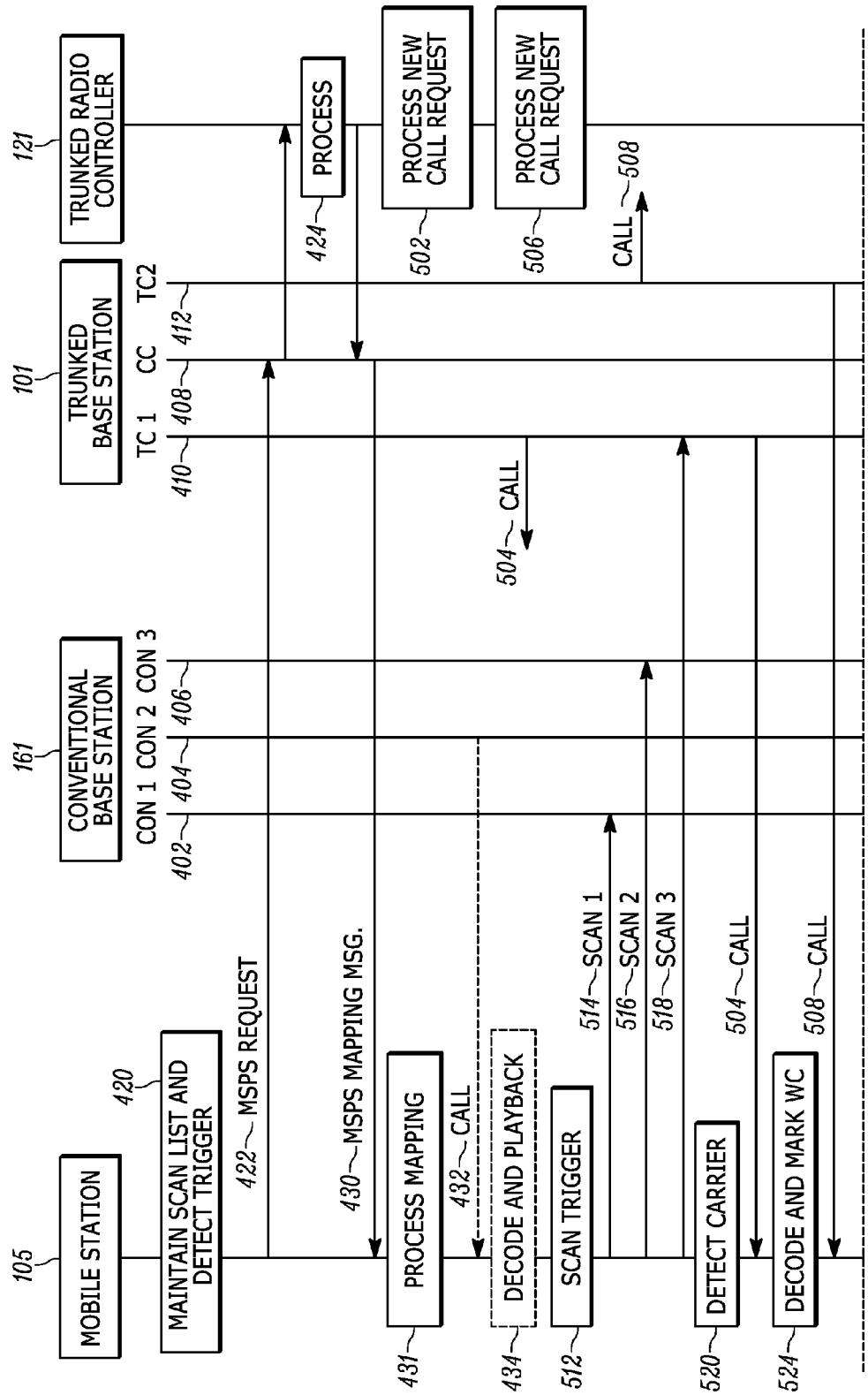
FIGS. 5A-5B set forth a ladder diagram illustrating a second example process for scanning multiple wireless communication systems in accordance with an embodiment.
Figure 5B:
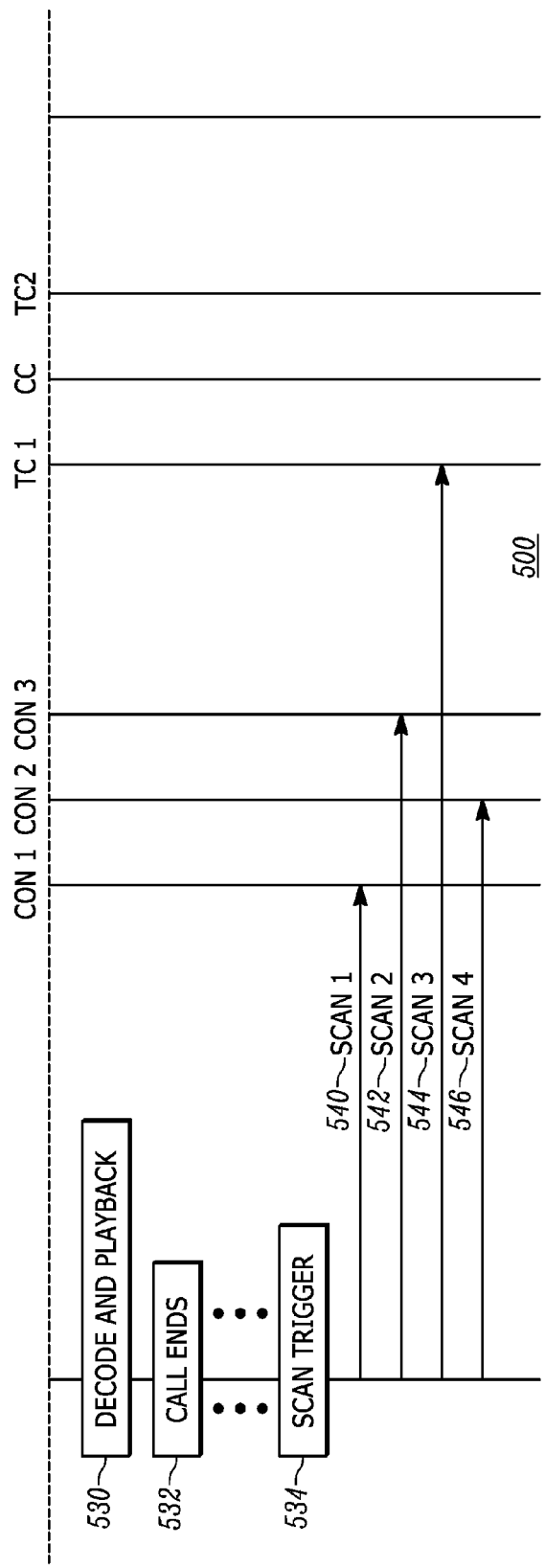

FIGS. 5A-5B illustrate a second example ladder diagram 500 in accordance with an embodiment for priority scanning across trunked and conventional radio systems. Steps, transmissions, and receptions 420-434 of FIG. 5A are identical to those set forth in FIG. 4A, and in the interest of brevity, are not repeated here. Furthermore, it is assumed that the MS 105 initially maintains a same scan list as that set forth at step 420 of FIG. 4A, as further modified by the MSPS mapping message 430. Starting then at step 502 of FIG. 5A, the trunked radio controller 121 detects and processes a new call request from a MS, dispatch console, or some other source communication device that has requested to transmit a new group call to a second trunked talkgroup. In response, the trunked radio controller 121 retrieves the working channel mapping for the second trunked talkgroup (e.g., locally via static memory 216 or remotely via data server 123) and identifies trunked traffic channel 1 410 as the working channel for the requested new second trunked talkgroup call. Alternatively, the working channel for the second trunked talkgroup could be stored as traffic channel 2 412 or some other trunked traffic channel (not shown) at trunked BS 102, but because that working channel is already in use, the new second trunked talkgroup call is assigned to traffic channel 1 410. In either event, and as a result, the trunked radio controller 121 assigns the second trunked talkgroup call to the trunked traffic channel 1 410 and grants the call request. The new second trunked talkgroup call 504 is then caused to be repeated at the trunked BS 102 on trunked traffic channel 1 410.

Subsequently at step 506, the trunked radio controller 121 detects and processes a new call request from a MS, dispatch console, or some other source communication device that has requested to transmit a new group call to the first trunked talkgroup. In response, the trunked radio controller 121 retrieves the working channel mapping for the first trunked talkgroup (e.g., locally via static memory 216 or remotely via data server 123) and identifies trunked traffic channel 1 410 as the working channel for the requested new first trunked talkgroup call. The trunked radio controller 121 checks the status of trunked traffic channel 1 410, however, and determines that the second trunked talkgroup call 504 is still ongoing. As a result, the trunked radio controller 121 assigns the first trunked talkgroup call to some other available trunked traffic channel, in this case trunked traffic channel 2 412, and grants the call request. The new first trunked talkgroup call 508 is then caused to be repeated at the trunked BS 102 on trunked traffic channel 2 412. In addition, and because the first trunked talkgroup call is now being provided on a trunked traffic channel other than its previously assigned working channel (i.e., trunked traffic channel 1 410), the trunked radio controller 121 causes a link control (LC) message to be embedded in the second trunked talkgroup call 504 notifying first trunked talkgroup MSs that the first trunked talkgroup call 508 that would normally be found on the working channel/trunked traffic channel 1 410 can instead be found on trunked traffic channel 2 412.

In the mean time, at step 512, the MS 105 detects a scan trigger. In response to detecting the scan trigger 512, the MS 105 begins a scan operation. In an embodiment in which the MS 105 is idle, it may directly begin the scan operation. In an embodiment in which the MS 105 is engaged in conventional talkgroup call 432, it may wait for a period of inactivity in the call, an off-timeslot in the call, of control signalling period of the call, or some other beneficial period of time such that an amount of missed audio of the conventional talkgroup call 432 may be minimized. As set forth earlier, in the event that the scan list does not include any prioritization of channels, the MS 105 may randomly select a channel order, or may use a first in, first scan method such that the last-added scan channel is scanned last. Alternatively, if the scan list is a prioritized scan list or includes indications of channel or talkgroup priorities, the order of scan may be set accordingly. In the example of FIGS. 5A-5B, it is again assumed that the channels are prioritized in the following order (from highest priority to lowest priority): conventional channel 1 402, conventional channel 3 406, first trunked talkgroup working channel/trunked traffic channel 1 410, conventional channel 2 404.

The scan operation by MS 105, in accordance with the prioritized scan list maintained at the MS 105, begins by the MS 105 switching its receiver or transceiver to conventional channel 1 402 and scanning 514 the channel for a presence of a carrier that would indicate a presence of a call associated with one or more conventional talkgroups the MS 105 is interested in on conventional channel 1 402. In this case, there is no carrier detected, so the MS 105 proceeds to the next channel in the scan list by the MS 105 switching its receiver or transceiver to conventional channel 3 406 and scanning 516 the channel for a presence of a carrier that would indicate a presence of a call associated with one or more conventional talkgroups the MS 105 is interested in on conventional channel 3 406. Again, there is no carrier detected, so the MS 105 proceeds to the next channel in the scan list by the MS 105 switching its receiver or transceiver to the first trunked talkgroup working channel/trunked traffic channel 1 410 and scanning 518 the channel for a presence of a carrier that would indicate a presence of a call associated with one or more trunked talkgroups the MS 105 is interested in and that are mapped to trunked traffic channel 1 410 as a working channel. In this case, because the second trunked talkgroup call 504 is present on the working channel/trunked traffic channel 1 410, the MS 105 detects a carrier at step 520 via the scanning process 518. Because the trunked traffic channel 1 410 is typically the assigned working channel for the first trunked talkgroup, it is possible that the detection of a carrier indicates an active first trunked talkgroup call on working channel/trunked traffic channel 1 410, but it is not guaranteed, as another trunked talkgroup could potentially be assigned trunked traffic channel 1 410 as its working channel as well.

Accordingly, at step 524, the MS 105 retrieves and decodes control signalling (e.g., headers and/or embedded signalling) via call 504, determines via the signalling that the call 504 is in fact for a different second trunked talkgroup that the MS 105 is not interested in (instead of the first trunked talkgroup that it is interested in and was expecting). Because there is an active call on the working channel associated with the first trunked talkgroup to which the MS 105 is subscribed, and to prevent the MS 105 from continuously returning to the trunked traffic channel 1 410 and spending time decoding signalling to determine whether a call on the trunked traffic channel 1 410 is for the first trunked talkgroup, the MS 105 marks the working channel mapped to the first trunked talkgroup in its scan list as "occupied by others." As a result, future scans by the MS 105 will simply check the working channel/trunked traffic channel 1 410 for a carrier, and if a carrier is detected, leave the working channel marked as "occupied by others" without spending time to further decode signalling. Only after checking working channel/trunked traffic channel 1 410 for a carrier during a scan and not finding a carrier (i.e., indicating the prior second trunked talkgroup call has finished) is the "occupied by others" marking removed, causing any subsequent carrier detected on the working channel/trunked traffic channel 1 410 to result in a further decoding by the MS 105 to determine if a first trunked talkgroup call is active.

However, in this example at step 524, and because a first trunked talkgroup call 508 was started on trunked traffic channel 2 412, control signalling embedded in the second trunked talkgroup call 504 includes an indication that an active call for the first trunked talkgroup has been temporarily redirected and can temporarily be found on trunked traffic channel 2 412. MS 105 decodes that signalling and, in addition to marking working channel/trunked traffic channel 1 410 as "occupied by others," switches to trunked traffic channel 2 412, and at step 530 of FIG. 5B, receives and decodes control signalling of the call 508 to verify that a first trunked talkgroup call is available, and further decodes and plays back media associated with the first trunked talkgroup.

The MS 105 continues playing back media for the call 508, and perhaps executing one or more additional scan operations to scan higher priority channels during the first trunked talkgroup call 508, until both the first trunked talkgroup call 508 and the second trunked talkgroup call 504 end by step 532. In some embodiments, and assuming the conventional call 432 is still ongoing after the calls end at step 532, the MS 105 may rejoin the conventional call 432 on conventional channel 2 404.

At step 534, another scan trigger is detected and the MS 105 begins another scan operation, starting again with conventional channels 1 402 and 3 406 via scan operations 540 and 542, during which no carrier is detected on either of one of the conventional channels. MS 105 then scans the working channel/trunked traffic channel 1 410 for a carrier and, finding none, can be guaranteed that there is no call activity for the first trunked talkgroup available at BS 102 (or any other trunked BSs associated with the trunked radio controller 121). As there is no carrier on working channel/trunked traffic channel 1 410, the MS 105 can also be assured that the prior call on trunked traffic channel 1 410 (e.g., the second trunked talkgroup call) has been completed, and the MS 105 can clear the "occupied by others" mark in its scan list with respect to the first trunked talkgroup working channel/trunked traffic channel 1 410. Finally, and assuming the conventional call 432 had ended, the MS 105 scans conventional channel 2 404 and finds no carrier. The MS 105 subsequently returns to an idle state and awaits another scan trigger or, in some embodiments, immediately begins another round of scan.

III. Conclusion

In accordance with the foregoing, an improved method, apparatus, and system for scanning across trunked and conventional radio systems. As a result, MSs scanning across multiple radio communications systems, including conventional and trunked radio communications systems, can more quickly and efficiently scan for priority calls. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of multi-system priority scan, the method comprising:
   maintaining, at a mobile station, a scan list including channels associated with talkgroups the mobile station is interested in receiving, the talkgroups including one or more trunked radio system talkgroups and one or more conventional radio system talkgroups;
   negotiating, with a trunked radio system, a working channel for a particular trunked radio system talkgroup out of the one or more trunked radio system talkgroups, wherein the working channel is a traffic channel that the trunked radio system will first attempt to assign a call for the particular trunked radio system talkgroup; and
   during a subsequent scan for talkgroup activity in one or more of the talkgroups in the scan list, scanning for activity associated with the particular trunked radio system talkgroup by switching to the working channel and determining if a carrier is present on the working channel, without switching to a control channel of the trunked radio system to scan for activity associated with the particular trunked radio system talkgroup.

2. The method of claim 1, further comprising participating in a conventional call on a conventional channel associated with a particular conventional radio system talkgroup out of the one or more conventional radio system talkgroups;
   wherein the subsequent scan is performed during the ongoing conventional call.

3. The method of claim 2, wherein the scan list includes a relative priority ranking of talkgroups, wherein the particular trunked radio system talkgroup is set to a higher priority in the scan list relative to the particular conventional radio system talkgroup.

4. The method of claim 1, further comprising determining that a carrier is present on the working channel, receiving and decoding a link control (LC) message, determining that a trunked call associated with the particular trunked radio system talkgroup is active on the working channel, and subsequently receiving, decoding, and playing back media associated with the trunked call.

5. The method of claim 4, further comprising, prior to the subsequent scan, participating in a conventional call on a conventional channel associated with a particular conventional radio system talkgroup out of the one or more conventional radio system talkgroups;
   wherein the subsequent scan is performed during the ongoing conventional call; and
   wherein the method further comprises refraining from returning to the conventional call while the trunked call remains ongoing.

6. The method of claim 1, further comprising determining that a carrier is not present on the working channel, and responsively determining that no trunked call is active for the particular trunked radio system talkgroup in the trunked radio system, without switching to the control channel of the trunked radio system to scan for activity associated with the particular trunked radio system talkgroup.

7. The method of claim 6, further comprising, prior to the subsequent scan, participating in a conventional call on a conventional channel associated with a particular conventional radio system talkgroup out of the one or more conventional radio system talkgroups;
   wherein the subsequent scan is performed during the ongoing conventional call; and
   wherein the method further comprises returning to the conventional call after determining that the carrier is not present on the working channel.

8. The method of claim 1, further comprising determining that a carrier is present on the working channel, receiving and decoding a link control (LC) message, determining that a trunked call not associated with the particular trunked radio system talkgroup is active on the working channel, and marking the working channel as occupied by others and refraining from receiving and decoding further messages on the working channel until activity on the working channel is terminated.

9. The method of claim 8, wherein refraining from receiving and decoding further messages on the working channel until activity on the working channel is terminated comprises during a further subsequent scan for talkgroup activity in one or more talkgroups in the scan list, determining that a carrier is no longer present on the working channel, and unmarking the working channel as occupied by others.

10. The method of claim 8, further comprising decoding the LC message and retrieving redirection information indicating that an active call associated with the particular trunked radio system talkgroup has been temporarily redirected to another trunked traffic channel also identified in the LC message, and responsively switching to the another trunked traffic channel and receiving, decoding, and playing back media associated with the trunked call, without switching to the control channel of the trunked radio system for further information regarding the particular trunked radio system talkgroup or the another trunked traffic channel.

11. The method of claim 1, wherein negotiating, with the trunked radio system, the working channel for the particular trunked radio system talkgroup comprises the mobile station transmitting, to a radio controller in the trunked radio system, a multiple system priority scan request message identifying the particular trunked radio system talkgroup and the mobile station receiving, in response, a mapping that maps the particular trunked radio system talkgroup to the assigned working channel.

12. The method of claim 11, further comprising the mobile station modifying the scan list to reflect the assigned working channel for the particular trunked radio system talkgroup.

13. The method of claim 11, further comprising including, in the multiple system priority scan request message, a plurality of trunked radio system talkgroups and the mobile station receiving, in response, a mapping that maps each of the plurality of trunked radio system talkgroups to different associated working channels.

14. The method of claim 1, further comprising
negotiating, with the trunked radio system, a second working channel for a second particular trunked radio system talkgroup out of the one or more trunked radio system talkgroups, wherein the second working channel is a traffic channel that the trunked radio system will first attempt to assign a call for the second particular trunked radio system talkgroup;
during a subsequent scan for talkgroup activity in one or more talkgroups in the scan list, scanning for activity associated with the particular trunked radio system talkgroup by switching to the working channel and determining if a carrier is present on the working channel and scanning for activity associated with the second particular trunked radio system talkgroup by switching to the second working channel and determining if a carrier is present on the second working channel, without switching to a control channel of the trunked radio system to scan for activity associated with the particular trunked radio system talkgroup or the second particular trunked radio system talkgroup.

15. A mobile station in a wireless communication system, the mobile station comprising:
a transceiver;
an input;
a speaker;
a microphone;
a processor; and
a computer readable memory having instructions stored thereon that, in response to execution by the processor, cause the mobile station to perform a set of operations comprising:
maintain a scan list including channels associated with talkgroups the mobile station is interested in receiving, the talkgroups including one or more trunked radio system talkgroups and one or more conventional radio system talkgroups;
negotiate, with a trunked radio system via the transceiver, a working channel for a particular trunked radio system talkgroup out of the one or more trunked radio system talkgroups, wherein the working channel is a traffic channel that the trunked radio system will first attempt to assign a call for the particular trunked radio system talkgroup; and
during a subsequent scan for talkgroup activity in one or more of the talkgroups in the scan list, scan, via the transceiver, for activity associated with the particular trunked radio system talkgroup by switching to the working channel and determine, via the transceiver, if a carrier is present on the working channel, without switching to a control channel of the trunked radio system to scan for activity associated with the particular trunked radio system talkgroup.

16. A radio controller in a trunked radio network, the radio controller comprising:
a transceiver;
a processor; and
a computer readable memory having instructions stored thereon that, in response to execution by the processor, cause the radio controller to perform operations comprising:
receive, via the transceiver from a mobile station, a multiple system priority scan request message identifying a particular trunked radio system talkgroup in the trunked radio network;
identify an available trunked traffic channel, out of a plurality of trunked traffic channels in the trunked radio network;
assign the available trunked traffic channel as a working channel for the particular trunked radio system talkgroup, wherein the working channel is a traffic channel that the radio controller will first attempt to assign any call for the particular trunked radio system talkgroup to; and
respond to the multiple system priority scan request by transmitting a mapping message to the mobile station that maps the particular trunked radio system talkgroup to the assigned working channel.

17. The radio controller of claim 16, wherein the operations further comprise:
receive a new call request from a second mobile station, the new call request being a group call addressed to the particular trunked radio system talkgroup; and
grant the new call request;
determine that the assigned working channel is available; and
cause the group call be to repeated on the assigned working channel.

18. The radio controller of claim 16, wherein the operations further comprise:
receive a new call request from a second mobile station, the new call request being a group call addressed to the particular trunked radio system talkgroup; and
grant the new call request;
determine that the assigned working channel is not available;
temporarily cause the group call be to repeated on a temporarily assigned second trunked traffic channel different from the available trunked traffic channel; and
embed a message in a link control (LC) message on a call occurring on the working channel indicating that the new group call is available on the temporarily assigned second trunked traffic channel.

19. The radio controller of claim 16, wherein the operations further comprise:
receive, via the transceiver from a mobile station, a multiple system priority scan request message identifying a plurality of particular trunked radio system talkgroups in the trunked radio network;
identify a corresponding plurality of available trunked traffic channels in the trunked radio network;
assign an identified available trunked traffic channel as a working channel for each of the particular trunked radio system talkgroups, wherein each working channel is a traffic channel that the radio controller will first attempt to assign a corresponding call for the particular trunked radio system talkgroup to;
respond to the multiple system priority scan request by transmitting a mapping message to the mobile station that maps each of the assigned working channels to the corresponding one of the particular trunked radio system talkgroups.

20. The radio controller of claim 16, wherein the working channel is a trunked traffic channel that is guaranteed either to carry every call to the particular trunked radio system talkgroup, or to carry an embedded message identifying another trunked traffic channel that is carrying the particular trunked radio system talkgroup if some other call is being carried on the working channel.

* * * * *